(12) United States Patent
Fujiwara

(10) Patent No.: US 9,796,351 B2
(45) Date of Patent: Oct. 24, 2017

(54) FAR SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/733,161

(22) Filed: Jun. 8, 2015

(65) Prior Publication Data
US 2015/0367803 A1 Dec. 24, 2015

(30) Foreign Application Priority Data
Jun. 23, 2014 (JP) .................. 2014-128634

(51) Int. Cl.
*B60R 21/207* (2006.01)
*B60R 21/216* (2011.01)
*B60R 21/231* (2011.01)
*B60R 21/2338* (2011.01)

(52) U.S. Cl.
CPC .......... *B60R 21/207* (2013.01); *B60R 21/216* (2013.01); *B60R 21/23138* (2013.01); *B60R 2021/23146* (2013.01); *B60R 2021/23161* (2013.01); *B60R 2021/23386* (2013.01)

(58) Field of Classification Search
CPC ............ B60R 21/207; B60R 21/23138; B60R 21/216; B60R 2021/23386; B60R 2021/23161; B60R 2021/23146; B60R 22/233; B60R 2021/23316
USPC ...................................... 280/728.2
See application file for complete search history.

(56) References Cited

U.S. PATENT DOCUMENTS

| | | | |
|---|---|---|---|
| 5,636,862 A * | 6/1997 | Cheung ................. | B60R 21/207 280/730.2 |
| 8,047,564 B2 * | 11/2011 | Kibat ................ | B60R 21/23138 280/730.2 |
| 2003/0168836 A1 * | 9/2003 | Sato ...................... | B60R 21/235 280/730.2 |
| 2005/0236819 A1 | 10/2005 | Riedel et al. | |

(Continued)

FOREIGN PATENT DOCUMENTS

JP 2005-306377 A 11/2005
JP 2008-302897 A 12/2008
(Continued)

*Primary Examiner* — Karen Beck
(74) *Attorney, Agent, or Firm* — Oliff PLC

(57) ABSTRACT

A far side airbag device comprising: a side airbag provided at a side section on a vehicle center side of a seatback, the side airbag comprising a rear inflation section and a front inflation section that inflates and deploys when supplied with gas through a communication path formed at a boundary with the rear inflation section; a fixing structure that fixes the side airbag to a seatback frame at the rear inflation section; and a tension cloth that receives tension and deploys accompanying inflation and deployment of the side airbag, wherein a vehicle front-rear direction front end side of the tension cloth is connected to the side airbag and a rear end side of the tension cloth is connected to the seatback frame, and in a deployed state, the tension cloth covers at least a portion of the rear inflation section as viewed from a side of the seatback.

9 Claims, 14 Drawing Sheets

(56) References Cited

U.S. PATENT DOCUMENTS

| | | | |
|---|---|---|---|
| 2010/0194083 A1* | 8/2010 | Sugimoto | B60R 21/207 280/730.2 |
| 2011/0025027 A1 | 2/2011 | Lim et al. | |
| 2011/0025034 A1 | 2/2011 | Lim et al. | |
| 2011/0049852 A1* | 3/2011 | Kibat | B60R 21/23138 280/743.2 |
| 2012/0049498 A1* | 3/2012 | Wiik | B60R 21/23138 280/743.2 |
| 2012/0091697 A1 | 4/2012 | Wiik et al. | |
| 2012/0181780 A1* | 7/2012 | Rickenbach | B60R 21/207 280/730.2 |
| 2013/0076014 A1* | 3/2013 | Thomas | B60R 21/231 280/743.2 |
| 2013/0200597 A1 | 8/2013 | Honda et al. | |
| 2014/0035264 A1* | 2/2014 | Fukushima | B60R 21/23138 280/730.2 |
| 2014/0217707 A1* | 8/2014 | Konishi | B60R 21/213 280/728.2 |
| 2015/0197212 A1* | 7/2015 | Fujiwara | B60R 21/233 280/729 |
| 2015/0239423 A1* | 8/2015 | Hayashi | B60R 21/231 280/729 |
| 2015/0343985 A1* | 12/2015 | Sugimoto | B60R 21/23138 280/730.2 |
| 2015/0367803 A1* | 12/2015 | Fujiwara | B60R 21/207 280/728.2 |
| 2015/0367804 A1* | 12/2015 | Fujiwara | B60R 21/23138 280/730.2 |
| 2016/0031406 A1* | 2/2016 | Yamanaka | B60R 21/26 280/728.2 |
| 2016/0031407 A1* | 2/2016 | Yamanaka | B60R 21/233 280/728.2 |
| 2016/0090060 A1* | 3/2016 | Fujiwara | B60R 21/2334 280/729 |
| 2016/0114755 A1* | 4/2016 | Matsuzaki | B60R 21/207 280/730.2 |
| 2016/0264091 A1* | 9/2016 | Fujiwara | B60R 21/2346 |

FOREIGN PATENT DOCUMENTS

| | | |
|---|---|---|
| JP | 2011-031871 A | 2/2011 |
| JP | 2012-051557 A | 3/2012 |
| JP | 2012-081958 A | 4/2012 |
| JP | 2013-159305 A | 8/2013 |

* cited by examiner

FAR SIDE AIRBAG DEVICE

CROSS-REFERENCE TO RELATED APPLICATION

This application claims priority under 35 USC 119 from Japanese Patent Application, No. 2014-128634 filed Jun. 23, 2014, the disclosure of which is incorporated by reference herein.

BACKGROUND OF THE INVENTION

Technical Field

The present invention relates to a far side airbag device.

Related Art

Airbag devices, such as that described in Japanese Patent Application Laid-Open (JP-A) No. 2012-051557, are known in which a slit is formed in a non-inflating section disposed at a central portion of an airbag body, with one end of a tether that passes through the slit connected to a front end of the airbag body when inflated and deployed, and the other end of the tether connected to a seat structural member.

Raising the internal pressure of an airbag is a simple and effective way to improve the restraint performance of a seated occupant by the airbag. Note that the airbag device of the above configuration is provided with an airbag having a single inflation section (known as a single chamber). The internal pressure is accordingly uniform across all locations that could contact the seated occupant. However, in consideration of differences in resilience of respective parts of the human body (for example, front parts of the chest and abdomen have low resilience), there is a limit to how high the internal pressure of the airbag can be raised. Namely, there is room for improvement from the perspective of suppressing movement of a seated occupant using the airbag (securing/improving on a required restraint performance).

A subject of the present invention is to obtain a far side airbag device capable of effectively suppressing movement of a seated occupant toward a vehicle center side in the vehicle width direction.

SUMMARY

A far side airbag device of a first aspect of the present invention includes: a side airbag provided to a side section on a vehicle center side of a seatback in a vehicle width direction, the side airbag including a rear inflation section that inflates and deploys when supplied with gas and that restrains at least rear parts of the chest and abdomen of a seated occupant, and a front inflation section that inflates and deploys when supplied with gas through a communication path formed at a boundary with the rear inflation section and that restrains at least front parts of the chest and abdomen of the seated occupant; a fixing structure that fixes the side airbag to a seatback frame at the rear inflation section; and a tension cloth that receives tension and deploys accompanying inflation and deployment of the side airbag, wherein a vehicle front-rear direction front end side of the tension cloth is connected to the side airbag and a vehicle front-rear direction rear end side of the tension cloth is connected to the seatback frame, and in a deployed state, the tension cloth covers at least a portion of the rear inflation section as viewed from a side of the seatback.

In this far side airbag device, in the event of a side-on collision for example, the rear inflation section inflates and deploys when the rear inflation section is supplied with gas, and the front inflation section inflates and deploys when the front inflation section is supplied with gas through the communication path from the rear inflation section. The rear inflation section, that contacts the rear parts of the chest and abdomen of the seated occupant that have relatively high resilience, inflates and deploys with a relatively high internal pressure, and the front inflation section, that contacts the front parts of the chest and abdomen of the seated occupant that have relatively low resilience, inflates and deploys with a relatively low internal pressure.

The tension cloth receives tension between respective connection portions connecting the tension cloth to the side airbag and the seatback frame accompanying inflation and deployment of the side airbag, and deploys to cover at least a portion of the rear inflation section as viewed from the side of the seatback. The tension cloth restricts rotation of the side airbag, namely the rear inflation section, about a fixing location to the seatback frame configured by the fixing structure and movement of the side airbag toward the rear at the vehicle center side in the vehicle width direction is restricted. Due to the tension cloth, the side airbag obtains a reaction force from the seatback frame at the relatively high pressure rear inflation section, thereby suppressing movement of the seated occupant toward the vehicle center side in the vehicle width direction (restraining the seated occupant).

The first aspect accordingly enables movement of the seated occupant toward the vehicle center side in the vehicle width direction to be more effectively suppressed in the event of a side-on collision or the like than in a configuration in which a tension cloth is not provided.

A far side airbag device of a second aspect of the present invention is the first aspect, wherein the rear inflation section includes a shoulder restraint portion that restrains the shoulder region of the seated occupant in an inflated and deployed state, and the tension cloth deploys to cover at least a portion of the shoulder restraint portion as viewed from the side of the seatback.

In this far side airbag device, the shoulder restraint portion of the side airbag effectively restrains the seated occupant at the shoulder region, this being a part of human body with high resilience. In particular, the tension cloth, that covers at least a portion of the shoulder restraint portion as viewed from the side of the seatback, effectively restricts movement of the shoulder restraint portion toward the vehicle center side in the vehicle width direction.

A far side airbag device of a third aspect of the present invention is either the first aspect or the second aspect, including, as the tension cloth, an outside tension cloth with the rear end side thereof connected to a portion of the seatback frame positioned to the rear side of the fixing structure in the vehicle front-rear direction, and that deploys at the seat width direction outside of the side airbag.

In this far side airbag device, the outside tension cloth deploys at the seat width direction outside of the rear inflation section (at the vehicle center side in the vehicle width direction) due to tensile force. The outside tension cloth presses the side airbag against the seatback frame at a portion further to the rear side than the fixing location to the seatback frame. This pressing force and a moment due to the pressing force restrict the side airbag that receives load toward the vehicle center side in the vehicle width direction from the seated occupant from rotating about the location where the fixing structure fixes the side airbag to the seatback frame.

A far side airbag device of a fourth aspect of the present invention is the third aspect, wherein in plan view, a peripheral length of the outside tension cloth from a connection location with the side airbag to a connection location with the seatback frame is the same as or less than a peripheral length of the side airbag from a fixing location with the seatback frame to the connection location with the outside tension cloth.

In this far side airbag device, the peripheral length between the front and rear ends of the outside tension cloth is the same as or less than the peripheral length of the side airbag from the fixing location with the seatback frame to the connection location with the outside tension cloth. Tension accordingly acts on the outside tension cloth accompanying inflation and deployment of the side airbag, and the outside tension cloth restricts rotation of the rear inflation section about the fixing location of the rear inflation section to the seatback frame by the fixing structure.

A far side airbag device of a fifth aspect of the present invention is the configuration of any one of the first aspect to the fourth aspect, including, as the tension cloth, an inside tension cloth that deploys at the seat width direction inside of the side airbag.

In this far side airbag device, the inside tension cloth that receives tension and deploys at the seat width direction inside (seat center side) of the side airbag supports the rear inflation section by pulling from the seat width direction inside. This support (tensile) force restricts rotation of the side airbag, that receives load toward the vehicle width direction central side from the seated occupant, about the fixing location of the side airbag to the seatback frame with the fixing structure.

A far side airbag device of a sixth aspect of the present invention is any one of the first aspect to the fifth aspect, wherein the front inflation section includes a portion that inflates and deploys to the upper side of the rear inflation section in a vehicle up-down direction, and the tension cloth deploys to cover at least an upper portion of the rear inflation section.

In this far side airbag device, the tension cloth restricts at least an upper portion of the rear inflation section, namely a vehicle up-down direction central portion of the side airbag, from moving toward the front. Namely, the inflation and deployment position (trajectory) of the rear inflation section is stabilized. The upper portion of the rear inflation section that has relatively high internal pressure is a location with a relatively high potential to interfere a seated occupant when the occupant sits in an irregular seating posture (out of position). However, restricting movement of this location contributes to a reduction in the likelihood of interference of the rear inflation section with a seated occupant when in an irregular seating posture.

A far side airbag device of a seventh aspect of the present invention is any one of the first aspect to the sixth aspect, wherein a length of the tension cloth in the vehicle up-down direction at the rear end side of the tension cloth is shorter than a length of the tension cloth in the vehicle up-down direction at the front end side of the tension cloth.

In this far side airbag device, the up-down width of the tension cloth is short on the side where the tension cloth is connected to the seatback frame, thereby simplifying the connection structure of the tension cloth to the seatback frame. Connection to a curved seatback frame is also made simple.

A far side airbag device of an eighth aspect of the present invention is any one of the first aspect to the seventh aspect, wherein the front end side of the tension cloth is connected to the side airbag at a boundary between the rear inflation section and the front inflation section.

This far side airbag device enables the rear inflation section, that inflates and deploys with a relatively high internal pressure, to be directly supported (movement-restricted) by the seatback frame.

A far side airbag device of a ninth aspect of the present invention is the fifth aspect, wherein at least one out of the rear end side of the outside tension cloth or a rear end side of the inside tension cloth is connected to the fixing structure.

In this far side airbag device, rotation of the side airbag, namely of the rear inflation section, about the fixing location of the side airbag to the seatback frame with the fixing structure (movement toward the rear at the vehicle center side in the vehicle width direction) is restricted.

A far side airbag device of a tenth aspect of the present invention is any one of the first aspect to the ninth aspect, wherein the front end side of the tension cloth is connected to the front inflation section.

As described above, the far side airbag device according to the present aspects exhibits the excellent advantageous effect of enabling movement of a seated occupant toward the vehicle center side in the vehicle width direction to be more effectively suppressed than in a configuration in which a tension cloth is not provided.

BRIEF DESCRIPTION OF THE DRAWINGS

Embodiments of the present invention will be described in detail based on the following figures, wherein:

FIGS. 10A and 10B are drawings illustrating a fifth modified example of a tension cloth configuring a far side airbag device according to an exemplary embodiment of the present invention, in which FIG. 10A is a cross-section corresponding to FIG. 1, and FIG. 10B is a side view;

DETAILED DESCRIPTION OF THE INVENTION

First Exemplary Embodiment

Figure 1:
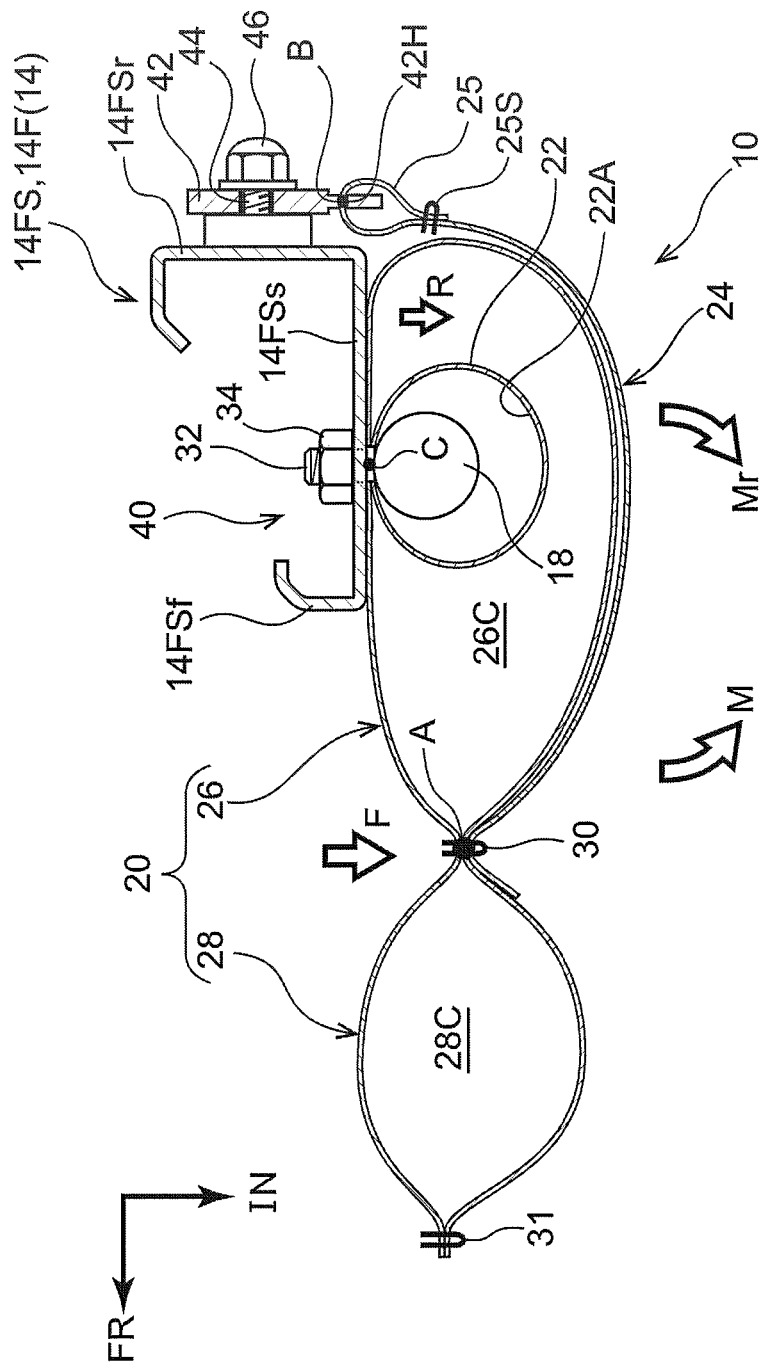
FIG. 1 is an enlarged cross-section taken along line 1-1 in FIG. 2, illustrating relevant portions of a far side airbag device according to a first exemplary embodiment of the present invention.
Figure 2:
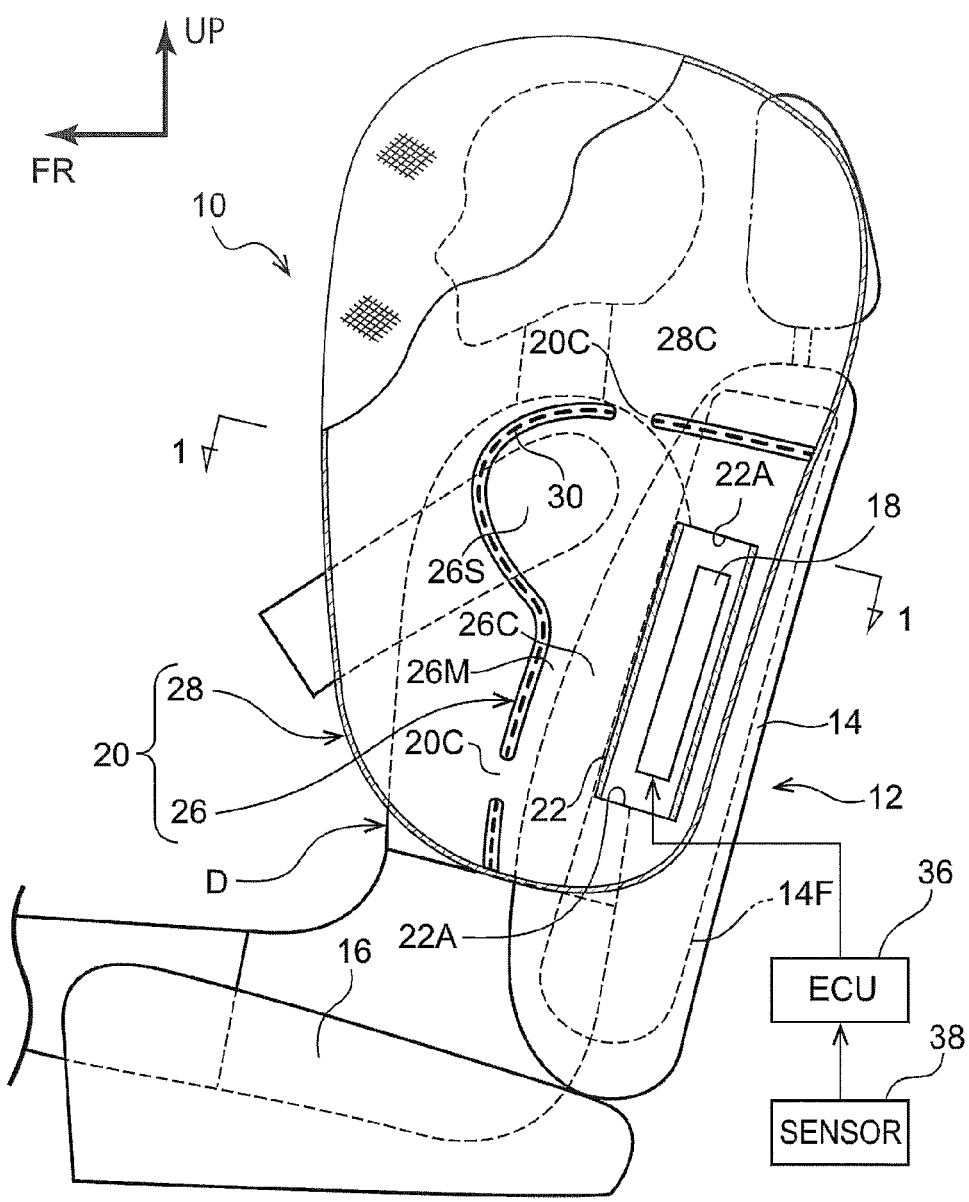
FIG. 2 is a side view illustrating a schematic overall configuration of a far side airbag device according to the first exemplary embodiment of the present invention, with a portion of a side airbag in an inflated and deployed state cut away.
Figure 3:
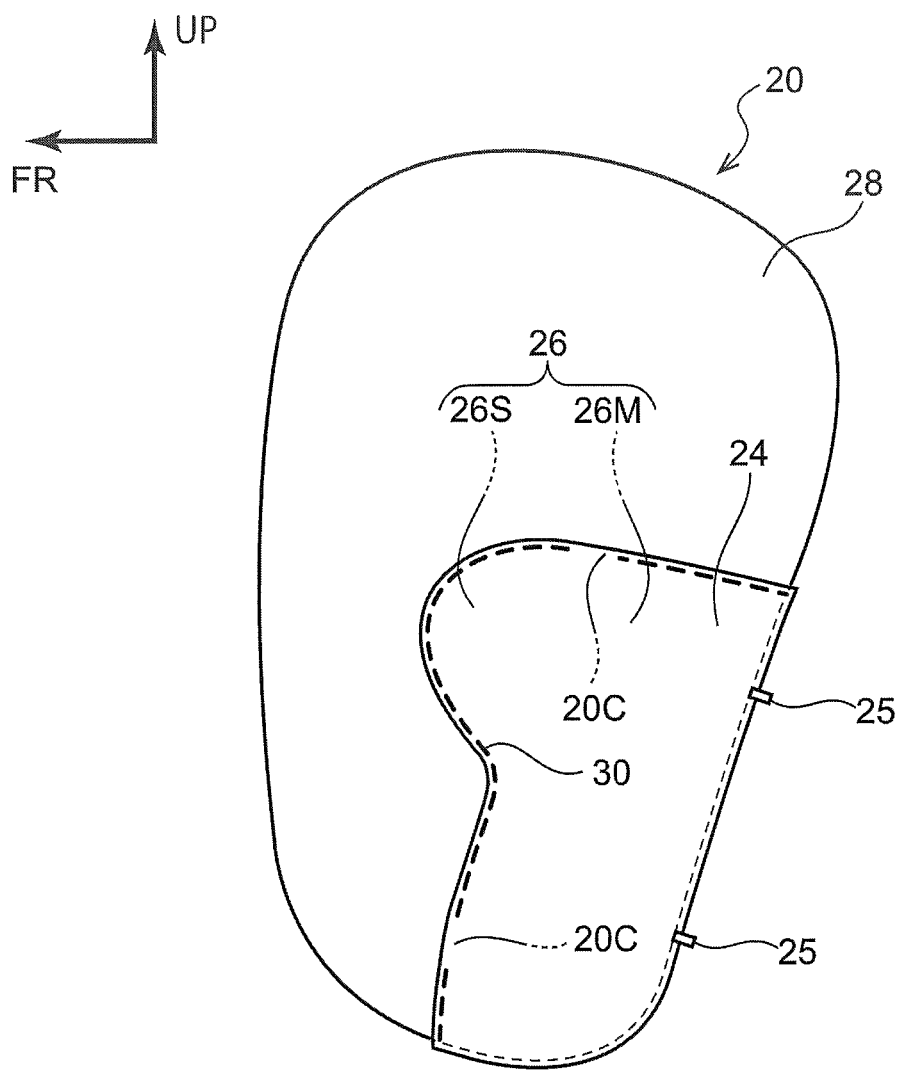
FIG. 3 is a side view illustrating an external shape of a side airbag and a tension cloth configuring a far side airbag device according to the first exemplary embodiment of the present invention.

Explanation follows regarding a far side airbag device 10 according to a first exemplary embodiment of the present invention, with reference to FIG. 1 to FIG. 3. Note that in the drawings, the arrow FR, the arrow UP, and the arrow IN respectively indicate the vehicle front direction, the vehicle upward direction, and the vehicle center side in the vehicle width direction, as appropriate. In the following explanation, unless specifically indicated, reference simply to the front and rear, up and down, and left and right directions refers to the front and rear in the vehicle front-rear direction, up and down in the vehicle up-down direction, and left and right when facing toward the front in the vehicle front-rear direction.

Schematic Overall Configuration of Far Side Airbag Device

As illustrated in FIG. 2, the far side airbag device 10 is installed to a seatback 14 of a vehicle seat 12. Specifically, the vehicle seat 12 is disposed offset to either the left or right side (on the right side in the example illustrated in the drawings) of the vehicle width direction center of a vehicle, not illustrated in the drawings, and the far side airbag device 10 is installed at a side section on the vehicle center side of the seatback 14 in the vehicle width direction.

In the present exemplary embodiment, the vehicle seat 12 is a front seat (a first row seat), namely a driving seat or passenger seat. The front-rear direction, the up-down direction, and the width (left-right) direction of the vehicle seat 12 correspond to the front-rear direction, the up-down direction, and the vehicle width direction of the vehicle. In the following explanation, the width direction of the vehicle seat 12 is also referred to as the seat width direction.

FIG. 2 illustrates a state in which a crash test dummy (mannequin) D is seated on a seat cushion 16 of the vehicle seat 12. The dummy D is, for example, a $50^{th}$ percentile American adult male (AM50) of World Side Impact Dummy (WorldSID). The dummy D is seated in a standard seating posture as stipulated under crash test method, and the vehicle seat 12 is positioned at a reference setting position corresponding to the seating posture. For ease of explanation, the dummy D is referred to hereafter as the "seated occupant D".

As explained in detail later, the far side airbag device 10 is configured so as to restrict movement of the seated occupant D in the vehicle seat 12 toward the collision side in the event of a side-on collision on the opposite side in the vehicle width direction to the side on which the vehicle seat 12 is installed. Namely, the far side airbag device 10 is configured to restrain the seated occupant D from the collision side in the event of a side-on collision.

The far side airbag device 10 includes an inflator 18 serving as a gas generation device, and a side airbag 20 that inflates and deploys on receipt of gas supplied from the inflator 18. In the present exemplary embodiment, the far side airbag device 10 further includes a flow regulator cloth 22 provided inside the side airbag 20, and a tension cloth 24 provided on the seat width direction outside of the side airbag 20.

The side airbag 20, the flow regulator cloth 22, the tension cloth 24, the inflator 18 and the like of the far side airbag device 10 configure a module. Although not illustrated in the drawings, the far side airbag device 10 is installed (housed) inside a side section on the vehicle center side of the seatback 14 in the vehicle width direction, with the side airbag 20, the flow regulator cloth 22, and the tension cloth 24 in a folded state.

The side airbag 20 is configured so as to inflate and deploy to the vehicle front side of the seatback 14, and on the vehicle center side (seat width direction outside) of the seated occupant D in the vehicle width direction, on receipt of gas supplied from the inflator 18. Unless specifically indicated, reference to the shape of the side airbag 20 in the following explanation refers to the shape in an inflated and deployed state.

The side airbag 20 is divided (segmented) into two inflation sections 26, 28, adjacent to the front and rear of each other. Specifically, as viewed from the side, part of the side airbag 20 that inflates on receipt of a gas supply is divided into a rear inflation section 26 configuring a rear lower portion of the side airbag 20, and a front inflation section 28 configuring the remainder of the part. In other words, a space inside the side airbag 20 is partitioned into a rear chamber 26C that is a space inside the rear inflation section 26, and a front chamber 28C that is a space inside the front inflation section 28. In the present exemplary embodiment, the boundary between the rear inflation section 26 and the front inflation section 28 is formed by stitching together a base cloth on both vehicle width direction sides of the side airbag 20 at a seam 30.

The rear inflation section 26, namely the rear chamber 26C, includes a main inflation portion 26M that, as viewed from the side, has a rectangular shape that is long in the up-down direction, following the seatback 14, and a secondary inflation portion 26S that projects out toward the front from an upper end side of the main inflation portion 26M. The main inflation portion 26M mainly restrains a rear part of the chest and abdomen of the seated occupant D from the vehicle center side in the vehicle width direction. The secondary inflation portion 26S mainly restrains the shoulder region of the seated occupant D from the vehicle center side in the vehicle width direction, and corresponds to a shoulder restraint portion of the present invention.

The front inflation section 28, namely the front chamber 28C, is formed with an inverted L-shape as viewed from the side, so as to be adjacent to the rear inflation section 26 to the front and from above. The front inflation section 28 mainly restrains front parts of the chest and abdomen, and the head, of the seated occupant D from the vehicle center side in the vehicle width direction.

The inflator 18 is installed inside the rear chamber 26C, and is configured so as to generate gas inside the rear chamber 26C (supply gas to the rear chamber 26C). The rear chamber 26C and the front chamber 28C are in communication with each other through communication paths 20C. The communication paths 20C are formed as portions (discontinuous portions) of the boundary between the rear chamber 26C and the front chamber 28C, where the seam 30 is not present. In the present exemplary embodiment, a communication path 20C in communication with the front chamber 28C is formed at a lower portion of the rear chamber 26C (main inflation portion 26M) so as to open forward, and another communication path 20C in communication with the front chamber 28C is formed at an upper end portion of the rear chamber 26C (main inflation portion 26M) so as to open upward.

The front chamber 28C is accordingly supplied with gas from the inflator 18 through the rear chamber 26C. In the side airbag 20, gas from the inflator 18 is accordingly supplied to the front chamber 28C through the communication paths 20C after having been supplied to the rear chamber 26C, giving a configuration in which the internal pressure of the rear inflation section 26 is higher than the internal pressure of the front inflation section 28 in the inflated and deployed state. In the present exemplary embodiment, an internal pressure adjustment means to give the rear inflation section 26 a higher internal pressure than the internal pressure of the front inflation section 28 is implemented by the configuration of placing the inflator 18 inside the rear chamber 26C, and the configuration of placing the rear chamber 26C and the front chamber 28C in communication with each other through the communication paths 20C.

The side airbag 20 described above is, for example, formed in a bag shape by stitching together upper and lower edges, and front edges, of a base cloth that is folded back on itself at a rear end, and is divided into the rear inflation section 26 and the front inflation section 28 by the seam 30. The location formed with the seam 30 configures a non-inflation section. A nylon-based or polyester-based fabric, for example, may be employed as the base cloth. The stitching of the base cloth at the front edge (and upper and lower edges) of the side airbag 20 configures a seam 31, illustrated in FIG. 1.

As illustrated in FIG. 2, the inflator 18 is configured by what is known as a cylinder type inflator, and is installed inside the rear chamber 26C as described above, with its length direction oriented along the length direction of the seatback 14 as viewed from the side (substantially in the up-down direction). In the present exemplary embodiment, the inflator 18 and the flow regulator cloth 22 that houses the inflator 18 are both disposed inside the rear chamber 26C. The flow regulator cloth 22 is formed in a tube shape from a similar fabric to the base cloth of the side airbag 20, and, similarly to the inflator 18, is installed inside the rear chamber 26C oriented with its length direction substantially along the up-down direction.

Openings 22A are formed at upper and lower ends of the flow regulator cloth 22. Configuration is accordingly made such that gas generated by the inflator 18 is supplied into the rear chamber 26C through the upper and lower openings 22A of the flow regulator cloth 22. Namely, the flow regulator cloth 22 is provided so as to be inflated and deployed in a circular cylinder shape by the gas from the inflator 18, and to function as what is known as a diffuser.

Together with the inflator 18, the side airbag 20 and the flow regulator cloth 22 described above are fixed to a seatback frame 14F configuring the seatback 14. Specifically, as illustrated in FIG. 1, stud bolts 32 project out from an outer peripheral portion of the inflator 18 toward the seat width direction inside. Although not illustrated in the drawings, plural of the stud bolts 32 are disposed at separations to each other in the up-down direction. Each stud bolt 32 is screwed together with a nut 34 from a leading end side, in a state in which the stud bolt 32 penetrates the base cloth forming the rear inflation section 26 of the side airbag 20, a base cloth of the flow regulator cloth 22, and a side frame 14FS of the seatback frame 14F.

The side airbag 20 and the flow regulator cloth 22 are thereby fastened and fixed to the side frame 14FS of the seatback frame 14F through the inflator 18. A fastening structure 40, configured by the inflator 18 (the stud bolts 32 and the nuts 34), corresponds to a fixing structure of the present invention.

As illustrated in FIG. 2, the inflator 18 described above is electrically connected to an ECU 36, this being a control device. A sensor 38 that detects a side-on collision of the vehicle applied with the far side airbag device 10 is electrically connected to the ECU 36. The sensor 38 of the present exemplary embodiment can detect both the occurrence of a side-on collision or the inevitability of a side-on collision, and the side on which the side-on collision occurs (the left side or the right side). The ECU 36 and the sensor 38 may be understood as configuration elements of the far side airbag device 10 of the present exemplary embodiment.

The ECU 36 is configured to actuate the inflator 18 when (the inevitability of) a side-on collision of the vehicle has been detected based on a signal from the sensor 38. In the present exemplary embodiment, in the event of a side-on collision, the ECU 36 actuates the inflator 18 configuring the far side airbag device 10 that is disposed on the opposite side (far side) to the side of the side-on collision in the vehicle width direction of the vehicle seat 12.

Tension Cloth

As described above, the tension cloth 24, serving as an outside tension cloth, is provided on the vehicle center side (seat width direction outside) of the side airbag 20 in the vehicle width direction. One end of the tension cloth 24 is connected to the side airbag 20, and the other end is connected to a portion of the seatback frame 14F further to the rear side than the fastening structure 40. The tension cloth 24 is configured so as to deploy covering (overlapping) at least a portion of the rear inflation section 26 as viewed from the side on receipt of tension accompanying inflation and deployment of the side airbag 20. More specific explanation follows. Note that in the following explanation, unless specifically indicated, reference to the shape of the tension cloth 24 refers to the shape in the deployed state.

As illustrated in FIG. 3, the tension cloth 24 of the present exemplary embodiment is formed in an inverted L-shape with a portion jutting out toward the front from an upper end side of a rectangular shaped portion with length in the up-down direction, so as to cover substantially the entire face (the main inflation portion 26M and the secondary inflation portion 26S) of the rear inflation section 26 as viewed from the side. As illustrated in FIG. 1, a front end side of the tension cloth 24 is connected to the boundary between the rear inflation section 26 and the front inflation section 28 of the side airbag 20 by the seam 30 (stitching) that also divides the side airbag 20 into the rear inflation section 26 and the front inflation section 28.

A rear end side of the tension cloth 24 is connected to a rear wall 14FSr of the side frame 14FS of the seatback frame 14F. Note that more specifically, the side frame 14FS includes a side wall 14FSs, a front wall 14FSf extending from a front edge of the side wall 14FSs toward the seat width direction inside, and the rear wall 14FSr extending from a rear edge of the side wall 14FSs toward the seat width direction inside. The fastening structure 40 fixes the side airbag 20 in the vicinity of the front-rear direction center of the side wall 14FSs of the side frame 14FS. The rear end side of the tension cloth 24 is moreover connected to the rear wall 14FSr, positioned further to the rear side than the fastening structure 40.

More specifically, a plate 42, this being an anchor member, is fixed to the rear wall 14FSr, and the plate 42 is formed with anchor holes 42H. In the present exemplary embodiment, the plate 42 is fixed to the rear wall 14FSr by screwing together a welded stud bolt 44 and a nut 46, in a state in which the welded stud bolt 44 that is fixed by welding to the rear wall 14FSr penetrates the plate 42.

Anchor tabs 25 are provided extending from a rear edge portion of the tension cloth 24, and each anchor tab 25 is folded back on itself in a state passing through the anchor holes 42H of the plate 42, with the folded-back leading end side stitched to either the main body or the anchor tab 25 of the tension cloth 24 at a seam 25S. Each anchor tab 25 is thereby anchored to the plate 42, and the rear edge portion of the tension cloth 24 is connected to the seatback frame 14F at a portion further to the rear side than the fastening structure 40. In the present exemplary embodiment, two connection locations are provided between the rear edge portion of the tension cloth 24 and the seatback frame 14F, separated from each other in the up-down direction.

As viewed from above, a peripheral length of the tension cloth 24 from the connection location of the tension cloth 24 and the side airbag 20 (a front edge, see point A in FIG. 1) to the connection location of the tension cloth 24 and the plate 42 (a rear edge, see point B in FIG. 1) is denoted L24. As viewed from above, a peripheral length of the side airbag 20 from the fixing location of the side airbag 20 and the seatback frame 14F by the fastening structure 40 (see point C in FIG. 1) to the seam 30 (see point A in FIG. 1) around the seat width direction outside is L20. Note that the peripheral lengths L20, L24 are not labelled in the drawings.

In the far side airbag device 10, the peripheral length L24 of the tension cloth 24 is set at the same length as the peripheral length L20 of the side airbag 20, or less (L24≤L20). Accordingly, as illustrated in FIG. 1, when the side airbag 20 inflates and deploys, the tension cloth 24 is pressed outward in the seat width direction (the vehicle center side in the vehicle width direction) by the rear inflation section 26, and is imparted with tension. Note that in FIG. 1, the tension cloth 24 and the rear inflation section 26 are illustrated with a gap between them such that the tension cloth 24 and the rear inflation section 26 can be visually distinguished more easily.

Operation and Advantageous Effects

Explanation follows regarding operation of the first exemplary embodiment.

Explanation follows regarding operation of a far side airbag device 10 applied to the vehicle seat 12 on the opposite side to a side at which a side-on collision has occurred (on a collision-opposite side, or far side).

In the far side airbag device 10 configured as described above, the ECU 36 actuates the inflator 18 on detection of a side-on collision based on a signal from the sensor 38. When this is performed, in the vehicle seat 12 on the far side, gas generated by the inflator 18 is supplied to the rear chamber 26C of the side airbag 20 through the flow regulator cloth 22, and the rear inflation section 26 inflates and deploys on the vehicle center side of the seated occupant D in the vehicle width direction.

Gas is also supplied from the rear chamber 26C to the front chamber 28C through the communication paths 20C, and the front inflation section 28 inflates and deploys to the front of and above the rear inflation section 26. Note that in the inflated and deployed state of the side airbag 20, the internal pressure of the rear inflation section 26 is higher than the internal pressure of the front inflation section 28.

The rear parts of the chest and abdomen, and the shoulder region, of the seated occupant D in the far side vehicle seat 12 are thus firmly restrained by the rear inflation section 26 that has relatively high internal pressure. The front parts of the chest and abdomen, and the head, of the seated occupant D are gently restrained by the front inflation section 28 that has relatively low internal pressure. In other words, the rear parts of the chest and abdomen, and the shoulder region, these being parts of the human body with relatively high resilience (robust parts), are restricted from moving toward the collision side while bearing a large reaction force from the rear inflation section 26. However, the front parts of the chest and abdomen, and the head, these being parts of the human body with relatively low resilience are restricted from moving toward the collision side, and the reaction force from the front inflation section 28 is suppressed.

For example, in a comparative example provided with a single-chamber side airbag, the side airbag has uniform internal pressure throughout, this being an internal pressure comparable to that of the front inflation section 28 of the present exemplary embodiment. Accordingly, the restraining force on the rear parts of the chest and abdomen, and the shoulder region, is liable to be insufficient. However, in the present exemplary embodiment, the seated occupant D can be effectively restrained (protected in a side-on collision) by the rear inflation section 26 and the front inflation section 28 as described above.

Figure 20:
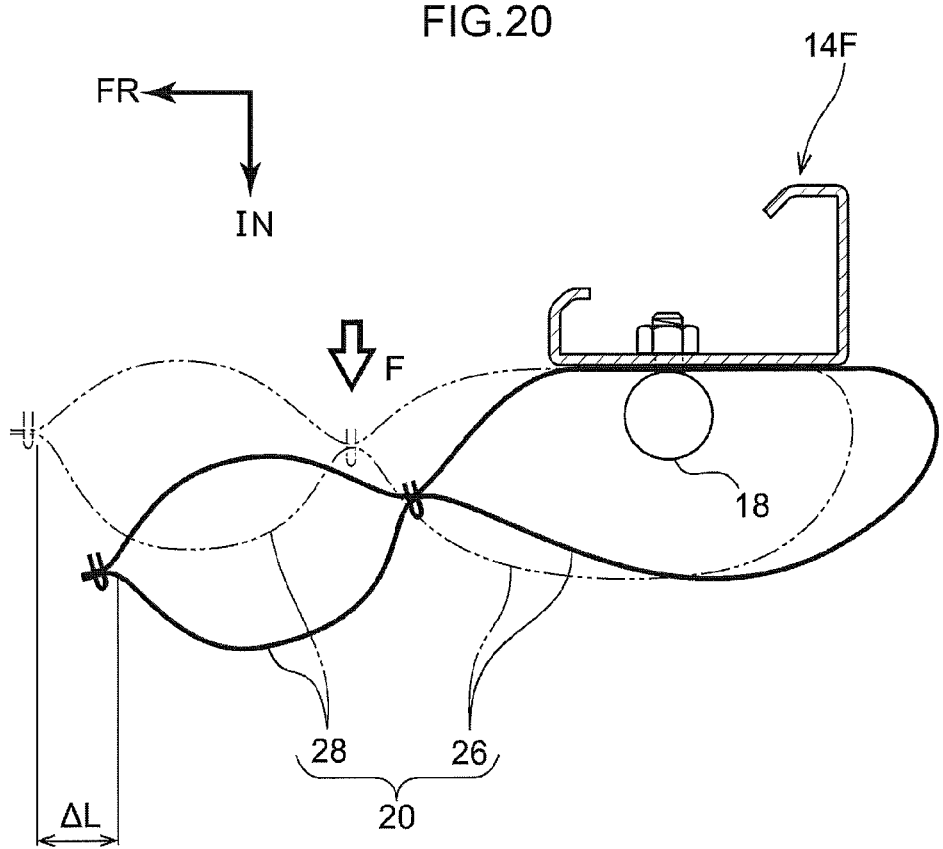
FIG. 20 is a cross-section corresponding to FIG. 1, schematically illustrating a mode of movement of a side airbag in a far side airbag device of a comparative example to an exemplary embodiment of the present invention.

In a comparative example not provided with the tension cloth 24, as illustrated in FIG. 20, there is a concern of the side airbag 20 rotating about the fastening structure 40 and moving (undergoing positional displacement) toward the rear at the vehicle center side in the vehicle width direction when the side airbag 20 receives a load F toward the vehicle width direction inside from the seated occupant D. Note that in FIG. 20, the side airbag 20 prior to restraining the seated occupant D is illustrated by intermittent lines, and an anticipated state of positional displacement is illustrated by solid lines. More specifically, in this comparative example, the side airbag 20 is only supported against the seatback frame 14F by the fastening structure 40, and so it is foreseeable that the base cloth on the vehicle center side in the vehicle width direction of the rear inflation section 26 could move away to the rear on receipt of the load F described above. If the side airbag 20 (receives the load F and) moves toward the rear in this manner while restraining the seated occupant D, the amount of overlap (overlapping width) between the side airbag 20 and the seated occupant D in the front-rear direction decreases (see ΔL in FIG. 20), and the restraining force placed on the seated occupant D by the side airbag 20 decreases.

However, in the far side airbag device 10 of the present exemplary embodiment, when the side airbag 20 inflates and deploys, the tension cloth 24 that couples the side airbag 20 to a portion of the seatback frame 14F further to the rear than the fastening structure 40 deploys while receiving tension. Namely, the peripheral length L24 of the tension cloth 24 from point A to point B in FIG. 1 is the same as or less than the peripheral length L20 of the side airbag 20 from point A to point C in FIG. 1, and so tension acts on the tension cloth 24 accompanying inflation and deployment of the side airbag 20.

In the deployed state, the tension cloth 24 covers the rear inflation section 26 as viewed from the side. The rear inflation section 26 of the side airbag 20 is accordingly supported from the side by the tension cloth 24, restricting rotation (positional displacement toward the rear at the vehicle center side) of the side airbag 20 about the fastening structure 40.

More specifically, the rear end of the tension cloth 24 is connected to the seatback frame 14F further to the rear than the fastening structure 40, and the tension cloth 24 contacts the rear inflation section 26 from the vehicle center side in the vehicle width direction. The rear inflation section 26 is accordingly pressed against the seatback frame 14F by reaction force from the tension cloth 24. Accordingly, even when moment M acts on the side airbag 20 due to the load F, moment Mr in a direction to cancel out the moment M acts on a portion of the rear inflation section 26 further to the rear than the fastening structure 40 due to a reaction force R against the pressing force described above (see FIG. 1). Rotation (positional displacement toward the rear at the vehicle center side) of the side airbag 20 about the fastening structure 40 is accordingly effectively restricted.

Due to the above, the far side airbag device 10 enables the seated occupant D moving toward the vehicle center side in the vehicle width direction to be restrained with a greater reaction force (restraining force) from the collision side in the vehicle width direction than in a configuration provided with a single chamber airbag, and not provided with a tension cloth.

Accordingly, the far side airbag device 10 according to the first exemplary embodiment enables movement of the seated occupant D toward the vehicle center side in the vehicle width direction to be effectively suppressed.

The tension cloth 24 deploys covering substantially the entire face of the rear inflation section 26 (the main inflation portion 26M and the secondary inflation portion 26S) as viewed from the side, thereby suppressing positional displacement toward the rear at the vehicle center side in the vehicle width direction of the secondary inflation portion 26S that restrains the shoulder region of the seated occupant D. Namely, positional displacement of the secondary inflation portion 26S with respect to the shoulder region of the seated occupant D is restricted by the tension cloth 24. This thereby enables movement of the seated occupant D toward the vehicle center side in the vehicle width direction to be even more effectively suppressed (restraining performance of the seated occupant D by the side airbag 20 is improved).

The front end of the tension cloth 24 is connected to the side airbag 20 at the seam 30 that divides the side airbag 20 into the rear inflation section 26 and the front inflation section 28. Portions of the side airbag 20 that inflate and deploy with relatively high internal pressure can accordingly be stably supported directly by the seatback frame 14F through the tension cloth 24. The tension cloth 24 can moreover be set without increasing the number of stitching locations in the side airbag 20.

Moreover, the side airbag 20, including the front inflation section 28 that inflates and deploys to the front of and above the rear inflation section 26 (that protects the head of the seated occupant D), has a large volume. In the comparative example in which the tension cloth 24 is not provided, the side airbag 20 is liable to move toward the front during inflation and deployment in the event of a side-on collision. When this occurs, there are concerns of the side airbag 20 interfering with the seated occupant D if the seated occupant D is in an irregular seating posture (out of position: OOP).

However, in the far side airbag device 10, the tension cloth 24 restricts the rear inflation section 26, namely the side airbag 20, from moving toward the front. In particular, since the tension cloth 24 couples at least an upper portion of the rear inflation section 26, namely a central portion of the side airbag 20 in the up-down direction, to the seatback frame 14F, the side airbag 20 has a stable orientation and is restricted from moving toward the front. Accordingly, the far side airbag device 10 contributes to a reduction in potential harm to the seated occupant D when in an irregular seating posture. In particular, although the secondary inflation portion 26S that projects out to the front of the main inflation portion 26M would otherwise be likely to interfere with the seated occupant D when in an irregular seating posture, the inflation and deployment orientation of the side airbag 20 is stabilized by the tension cloth 24, contributing to a reduction in potential interference by the secondary inflation portion 26S when the seated occupant D is in an irregular seating posture.

Other Exemplary Embodiments

Next, explanation follows regarding other exemplary embodiments of the present invention. Note that configuration and operation that is basically the same as that of the first exemplary embodiment or preceding exemplary embodiments are allocated the same reference numerals to in the first exemplary embodiment or the preceding exemplary embodiments, and explanation and illustration thereof may be omitted.

Second Exemplary Embodiment

Figure 4:
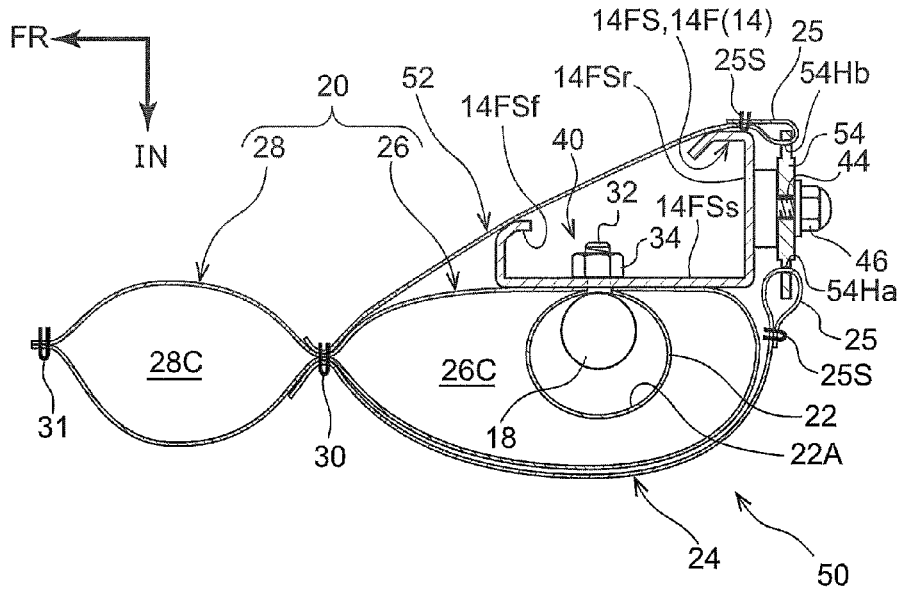
FIG. 4 is a cross-section corresponding to FIG. 1, illustrating relevant portions of a far side airbag device according to a second exemplary embodiment of the present invention.

FIG. 4 is a cross-section corresponding to FIG. 1, illustrating a far side airbag device 50 according to a second exemplary embodiment of the present invention. The far side airbag device 50 differs from the far side airbag device 10 of the first exemplary embodiment in that it is additionally provided with a tension cloth 52, serving as an inside tension cloth, as well as the tension cloth 24, serving as an outside tension cloth.

One end of the inside tension cloth 52 is connected to the side airbag 20 at a portion positioned further toward the front than the seatback frame 14F when in an inflated and deployed state, and the other end is connected to the seatback frame 14F. In other words, a front end side of the inside tension cloth 52 is connected to the side airbag 20, and a rear end side of the tension cloth 52 is connected the seatback frame 14F. The tension cloth 52 is configured so as to receive tension accompanying inflation and deployment of the side airbag 20, and deploy covering at least a portion of the rear inflation section 26 as viewed from the side. More specific explanation follows.

A front end of the inside tension cloth 52 is connected to the seam 30 (stitching), together with the front end of the tension cloth 24, at the boundary (dividing portion) between the rear inflation section 26 and front inflation section 28 of the side airbag 20. A rear end of the tension cloth 52 is connected (anchored) to a plate 54, provided in place of the plate 42.

Specifically, the plate 54 is formed with anchor holes 54Ha to which the anchor tabs 25 of the outside tension cloth 24 are anchored, and anchor holes 54Hb to which anchor tabs 25 of the inside tension cloth 52 are anchored. Respective anchor tabs 25 are provided extending from a rear edge portion of the tension cloth 52, and are anchored to the plate 54 by stitching a leading end side that is passed through the anchor hole 54Hb of the plate 54 and folded back on itself to (the body or the anchor tab 25 of) the tension cloth 52 at a seam 25S.

Each anchor tab 25 (at two locations above and below each other in the present exemplary embodiment) is anchored to the plate 54, thereby connecting the rear end of the tension cloth 52 to the seatback frame 14F. Note that a front-rear direction intermediate portion of the tension cloth 52 passes to the seat width direction inside of the seatback frame 14F, and the rear end of the tension cloth 52 reaches the rear wall 14FSr of the seatback frame 14F. Other configurations of the far side airbag device 50, including those of portions not illustrated in the drawings, are similar to corresponding configurations in the far side airbag device 10.

The far side airbag device 50 according to the second exemplary embodiment accordingly enables basically the same advantageous effects to be obtained from the same operation as the far side airbag device 10 according to the first exemplary embodiment.

In the far side airbag device 50, the inside tension cloth 52 that couples the side airbag 20 and the seatback frame 14F together deploys while receiving tension accompanying inflation and deployment of the side airbag 20. In the deployed state, the inside tension cloth 52 covers the rear inflation section 26 as viewed from the side. The rear inflation section 26 is pulled toward the seat width direction inside from the rear side by the tension cloth 52, thereby restricting rotation of the side airbag 20 about the fastening structure 40, namely restricting positional displacement toward the rear at the vehicle center side. In other words, similarly to in the first exemplary embodiment, moment in a direction to cancel out the moment M due to the load F also acts on the side airbag 20 (the rear inflation section 26) due to the inside tension cloth 52.

In particular, the inside tension cloth 52 is provided together with the outside tension cloth 24, thereby enabling an advantageous effect of restricting rotation of the side airbag 20 about the fastening structure 40 to be obtained by the tension cloths 24, 52. In other words, the rear inflation section 26 is retained against the seatback frame 14F so as to be sandwiched between the inner and outer tension cloths 24, 52 in the seat width direction. Rotation of the side airbag 20 about the fastening structure 40 is accordingly even more effectively restricted, contributing to improved restraint performance of the seated occupant D by the side airbag 20. Accordingly, in the far side airbag device 50, movement of the seated occupant D is more effectively restricted accompanying restraint of the seated occupant D by the side airbag 20 than in a configuration provided with only one out of the inner and outer tension cloths. This thereby enables movement of the seated occupant D toward the vehicle center side in the vehicle width direction to be effectively suppressed in the event of a side-on collision.

Third Exemplary Embodiment

Figure 5:
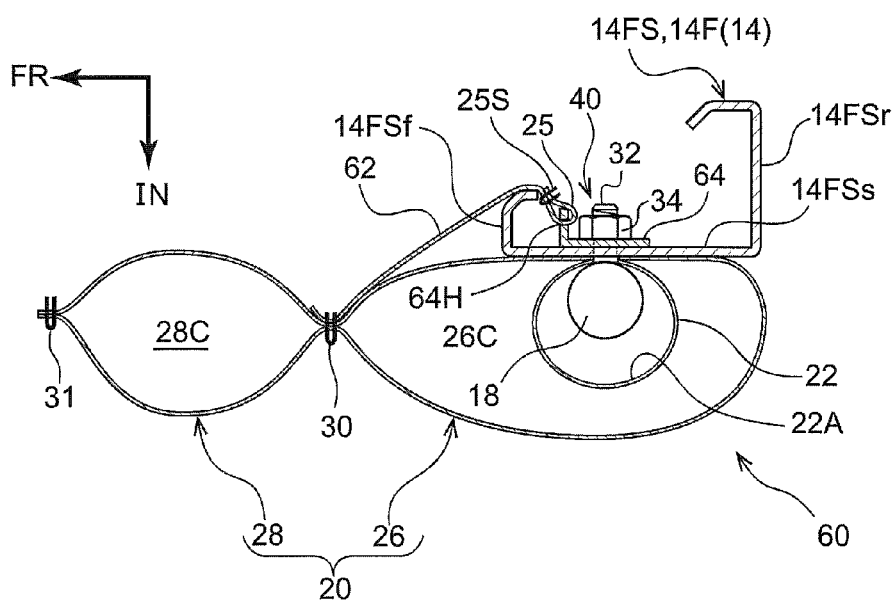
FIG. 5 is a cross-section corresponding to FIG. 1, illustrating relevant portions of a far side airbag device according to a third exemplary embodiment of the present invention.

FIG. 5 is a cross-section corresponding to FIG. 1, illustrating a far side airbag device 60 according to a third exemplary embodiment of the present invention. The far side airbag device 60 differs from the far side airbag device 10 according to the first exemplary embodiment in that it is provided with a tension cloth 62, serving as an inside tension cloth, in place of the tension cloth 24, serving as an outside tension cloth.

One end of the inside tension cloth 62 is connected to the side airbag 20 at a portion positioned further toward the front than the seatback frame 14F in an inflated and deployed state, and the other end of the inside tension cloth 62 is connected to the seatback frame 14F. In other words, a front end side of the tension cloth 62 is connected to the side airbag 20, and a rear end side is connected to the seatback frame 14F. The tension cloth 62 is configured so as to receive tension accompanying inflation and deployment of the side airbag 20, and to deploy covering at least a portion of the rear inflation section 26 as viewed from the side. More specific explanation follows.

A front end of the inside tension cloth 62 is connected to the seam 30 (stitching) at the boundary (dividing portion) between the rear inflation section 26 and the front inflation section 28 of the side airbag 20. A rear end of the inside tension cloth 62 is connected (anchored) to a plate 64 that is fixed to the side frame 14FS by the fastening structure 40.

Specifically, the plate 64 is formed with anchor holes 64H to which anchor tabs 25 of the inside tension cloth 62 are anchored. Each anchor tab 25 is provided extending from a rear edge portion of the inside tension cloth 62, and is anchored to the plate 54 by stitching an inside leading end side that is passed through the anchor hole 64H of the plate 64 and folded back on itself to (the body or the anchor tab 25 of) the tension cloth 62.

Each anchor tab 25 (at two locations above and below each other in the present exemplary embodiment) is anchored to the plate 64, thereby connecting the rear end of the inside tension cloth 62 to the seatback frame 14F. Note a front-rear direction intermediate portion of the inside tension cloth 62 passes to the seat width direction inside of the seatback frame 14F, and the rear end of the tension cloth 62 reaches the side wall 14FSs of the seatback frame 14F. Other configurations of the far side airbag device 60, including those of portions not illustrated in the drawings, are similar to corresponding configurations in the far side airbag device 10.

In the far side airbag device 60, the inside tension cloth 62 that couples the side airbag 20 and the seatback frame 14F together deploys while receiving tension accompanying inflation and deployment of the side airbag 20. In its deployed state, the inside tension cloth 62 covers the rear inflation section 26 as viewed from the side. The side airbag 20 is pulled toward the seat width direction inside from the rear side by the tension cloth 62, thereby restricting rotation of the side airbag 20 about the fastening structure 40, namely restricting positional displacement toward the rear at the vehicle center side. In other words, similarly to in the first exemplary embodiment, moment in a direction to cancel out the moment M due to the load F acts on the side airbag 20 (the rear inflation section 26) due to the tension cloth 62. Movement of the side airbag 20 toward the rear, and movement of the side airbag 20 toward the vehicle center side in the vehicle width direction, is accordingly effectively restricted.

Due to the above, the far side airbag device 60 enables the seated occupant D moving toward the vehicle center side in the vehicle width direction to be restrained by a larger reaction force (restraining force) than in a configuration provided with a single chamber airbag, and not provided with a tension cloth.

Accordingly, the far side airbag device 60 according to the third exemplary embodiment also enables movement of the seated occupant D toward the vehicle center side in the vehicle width direction to be effectively suppressed. Other operation and advantageous effects of the far side airbag device 60 are similar to the operation and advantageous effects of the far side airbag device 10, with the exception of operation and advantageous effects due to the outside tension cloth 24.

Summary of the Respective Exemplary Embodiments

To summarize the above, it is sufficient that the front end side of the tension cloth is connected to the side airbag 20, and a rear end side of the tension cloth is connected to the seatback frame, and that the tension cloth covers the rear inflation section 26 as viewed from the side in a state in which the tension cloth has received tension and deployed due to inflation and deployment of the side airbag 20.

Although outside tension cloths and inside tension cloths have different mechanisms to each other, both outside tension cloths and inside tension cloths enable rotation of the side airbag 20 about the fastening structure 40 to be restricted. In particular, in a configuration provided with both an inside tension cloth and an outside tension cloth, rotation (positional displacement) of the side airbag 20 about the fastening structure 40 is more effectively restricted due to the advantageous effects of both tension cloths.

Due to the above, the far side airbag devices according to the present embodiments enable a higher restraint performance of the seated occupant D to be obtained by providing either an outside tension cloth or an inside tension cloth, or by providing both an outside tension cloth and an inside tension cloth.

Modified Examples of Tension Cloth Dimensions and Shapes

Explanation follows regarding modified examples of the dimensions and shapes of tension cloths, with reference to FIG. 6 to FIG. 9.

Figure 6:
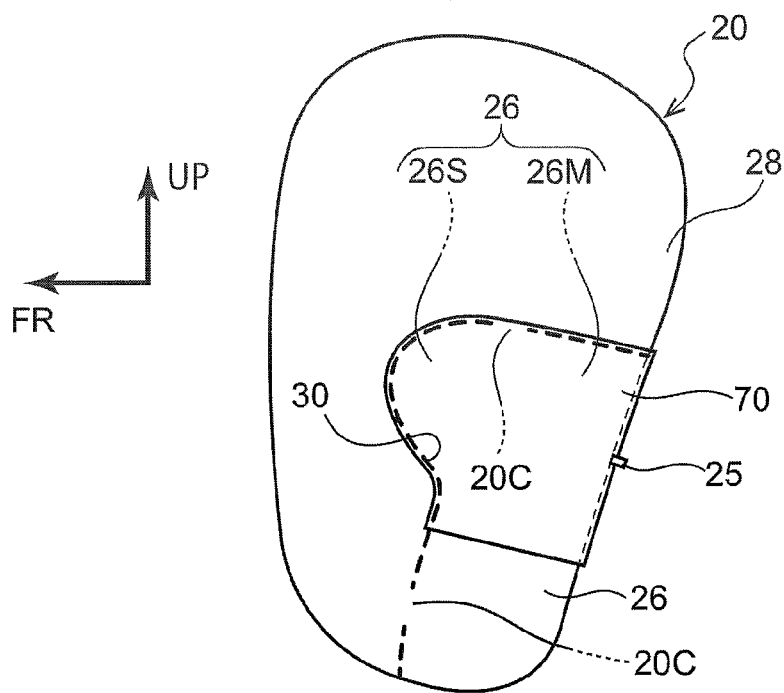
FIG. 6 is a side view illustrating a first modified example of a tension cloth configuring a far side airbag device according to an exemplary embodiment of the present invention.

FIG. 6 illustrates a tension cloth 70 according to a first modified example. As illustrated in FIG. 6, as viewed from the side, in a deployed state the tension cloth 70 is configured so as to cover an upper portion of the rear inflation section 26, namely an upper portion of the main inflation portion 26M, and the secondary inflation portion 26S. The tension cloth 70 is only provided with a single anchor tab 25.

Figure 7:
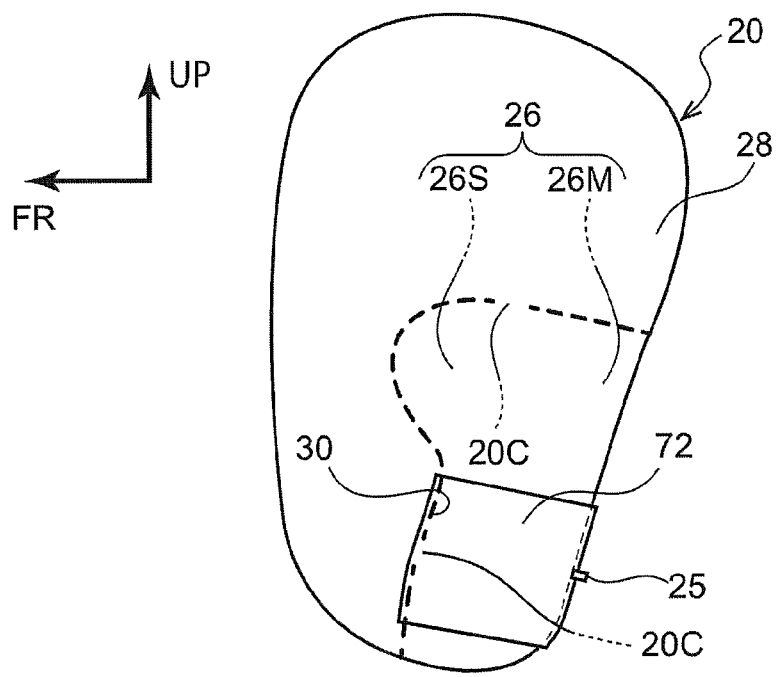
FIG. 7 is a side view illustrating a second modified example of a tension cloth configuring a far side airbag device according to an exemplary embodiment of the present invention.

FIG. 7 illustrates a tension cloth 72 according to a second modified example. As illustrated in FIG. 7, as viewed from the side, in a deployed state the tension cloth 72 is configured so as to cover a lower portion (up-down direction central portion) of the rear inflation section 26. More specifically, the tension cloth 72 is configured so as to cover the rear inflation section 26 below the location where the rear inflating section 26 is provided with the secondary inflation portion 26S. The tension cloth 72 is only provided with a single anchor tab 25.

Figure 8:
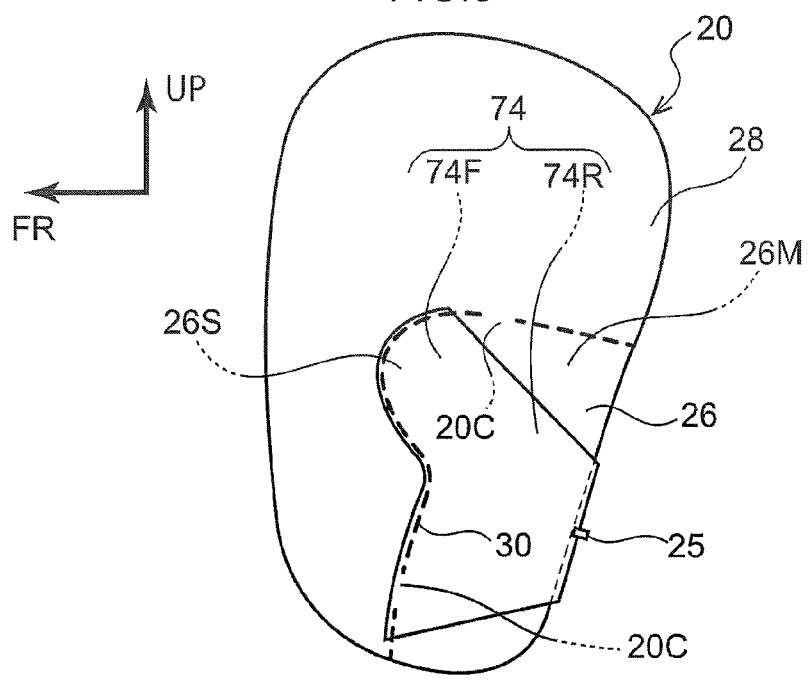
FIG. 8 is a side view illustrating a third modified example of a tension cloth configuring a far side airbag device according to an exemplary embodiment of the present invention.

FIG. 8 illustrates a tension cloth 74 according to a third modified example. As illustrated in FIG. 8, as viewed from the side, the tension cloth 74 is configured to cover the rear inflation section 26 in a deployed state, with a greater width along the up-down direction (up-down width) at a front end side than at a rear end side. Specifically, the tension cloth 74 is configured including a rear deployment portion 74R that covers a portion of the main inflation portion 26M, and a front deployment portion 74F that mainly covers the secondary inflation portion 26S in the deployed state as viewed from the side. The rear deployment portion 74R is formed in a trapezoidal shape with an up-down dimension gradually decreasing on progression from the front end to the rear end. The front deployment portion 74F is formed with a shape conforming to that of the secondary inflation portion 26S as viewed from the side. The tension cloth 72 is only provided with a single anchor tab 25.

The up-down length at the front end side of the tension cloth 74 is greater than the up-down length at the rear end side. This thereby enables the tension cloth 74 to be configured with a single connection point (anchor tab 25) to the seatback frame 14F, while securing a rotation restricting effect of the side airbag 20 equivalent to that of the tension cloth 24. In a far side airbag device 10 according to the present modified example, the ease of installation to a seatback frame 14F (side frame 14FS) that curves as viewed from the side can be improved compared to configurations provided with a tension cloth connected to the seatback frame 14F at plural locations above and below each other.

Figure 9:
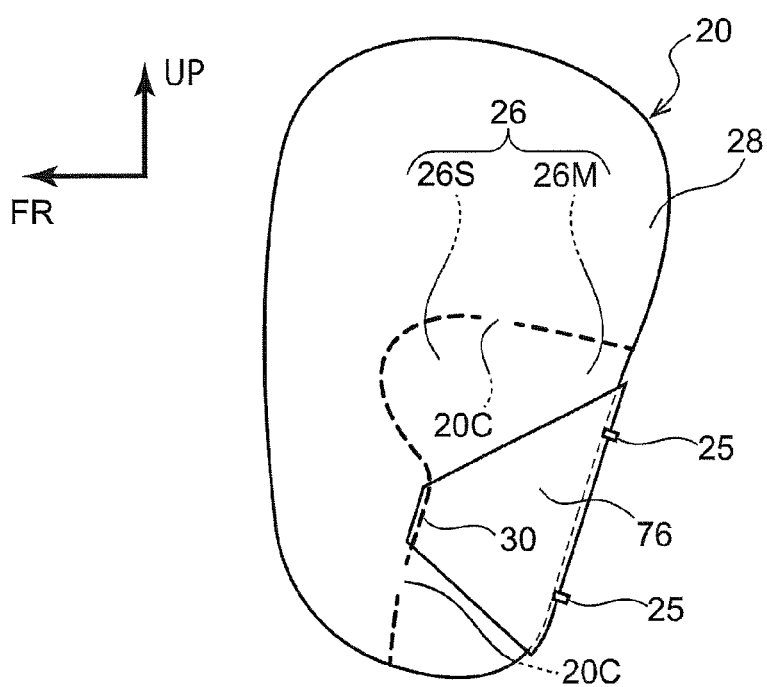
FIG. 9 is a side view illustrating a fourth modified example of a tension cloth configuring a far side airbag device according to an exemplary embodiment of the present invention.

FIG. 9 illustrates a tension cloth 76 according to a fourth modified example. As illustrated in FIG. 9, as viewed from the side, the tension cloth 76 is configured to cover the rear inflation section 26 in a deployed state, with a narrower up-down width at a front end side than at a rear end side. Specifically, as viewed from the side, in the deployed state the tension cloth 76 is formed in a trapezoidal shape of which the front end side configures the short edge and the rear end side configures the long edge. The front end side is connected to an upper part of a portion of the main inflation portion 26M, below the secondary inflation portion 26S (a central portion in the overall up-down direction). The tension cloth 72 is provided with two of the anchor tabs 25, separated from each other in the up-down direction.

Explanation has been given above regarding the shape of the tension cloth 70, 72, 74, and 76 serving as an outside tension cloth. However, these shapes may be applied to an inside tension cloth 52, 62 employed in place of the outside tension cloth.

Figure 10A:
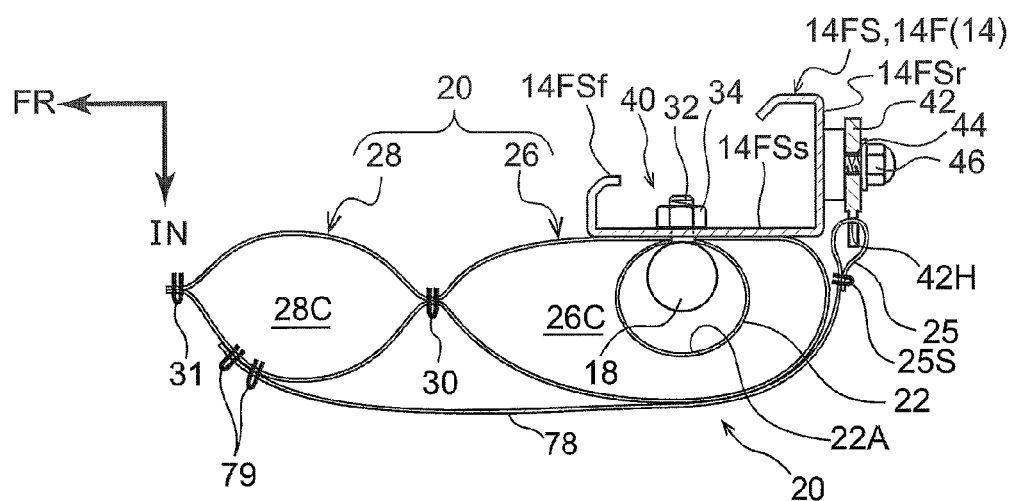
Figure 10B:
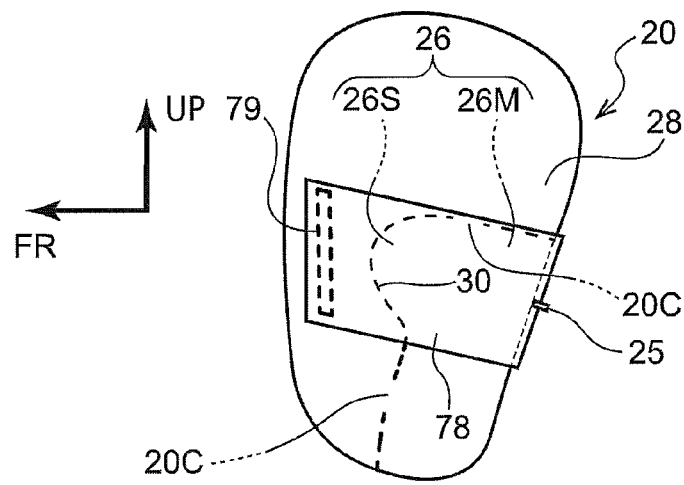
Figure 11:
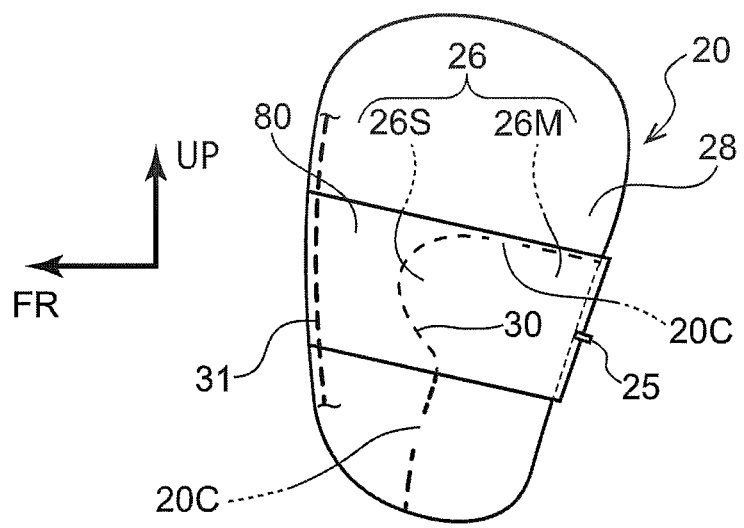
FIG. 11 is a side view illustrating a sixth modified example of a tension cloth configuring a far side airbag device according to an exemplary embodiment of the present invention.
Figure 12:
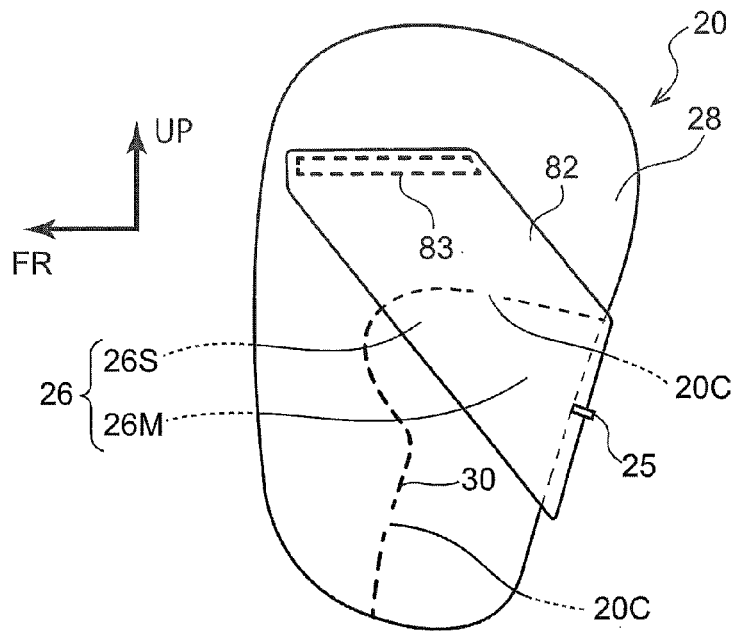
FIG. 12 is a side view illustrating a seventh modified example of a tension cloth configuring a far side airbag device according to an exemplary embodiment of the present invention.

Modified Examples of the Front End Side Connection Location of the Tension Cloth Explanation follows regarding modified examples of connection locations on the front end sides of tension cloths, with reference to FIG. 10 to FIG. 12.

FIG. 10A illustrates a tension cloth 78 according to a fifth modified example. As illustrated in FIG. 10A, the tension cloth 78 differs from the tension cloth 24 in that a front end side thereof is connected to the base cloth at the seat width direction outside of the front inflation section 28. The tension cloth 78 is configured so as to deploy in a rectangular shape extending along the front-rear direction. As illustrated in FIG. 10B, in this modified example, a front end of the tension cloth 78 is connected to the front inflation section 28 by stitching in a ring shaped seam 79. Employing the ring shaped seam 79 suppresses localized concentration of stress on the inflated and deployed front inflation section 28.

FIG. 11 illustrates a tension cloth 80 according to a sixth modified example. As illustrated in FIG. 11, the tension cloth 80 differs from the tension cloth 24, 78 in that a front end side thereof is connected to a front edge portion of the front inflation section 28. The tension cloth 80 is configured so as to deploy in a rectangular shape extending along the front-rear direction. In this modified example, a front end of the tension cloth 80 is connected to the front inflation section 28 by stitching together with the base cloth of the side airbag 20 at a seam 31 that configures a stitching location at a front edge of the side airbag 20. This thereby enables the tension cloth 80 to be set without increasing the number of stitching locations in the side airbag 20.

FIG. 12 illustrates a tension cloth 82 according to a seventh modified example. As illustrated in FIG. 12, the tension cloth 82 differs from the tension cloth 24, 78 in that a front end thereof is connected to the front inflation section 28 at a portion to the upper side of the rear inflation section 26, the portion is on the base cloth at the seat width direction outside in a head protection area. In a deployed state, the tension cloth 82 is configured so as to cover the rear inflation section 26 at an upper side portion of the main inflation portion 26M, and at an upper side portion of the secondary inflation portion 26S, as viewed from the side. In this modified example, the front end of the tension cloth 82 is connected to the location of the front inflation section 28 mentioned above by stitching in a ring shaped seam 83. Employing the ring shaped seam 83 suppresses localized concentration of stress on the inflated and deployed front inflation section 28.

Explanation has been given above regarding the shape of the tension cloth 78, 80, 82 serving as an outside tension cloth. However, these shapes may be applied to an inside tension cloth 52, 62 employed in place of the outside tension cloth. Moreover, explanation has been given above regarding examples in which the front end of the outside tension cloth 78, 80, and 82 or of an inside tension cloth is connected to the front inflation section 28. However, configuration may be made in which the front end of the outside tension cloth 78, 80, 82 or of an inside tension cloth is connected to the rear inflation section 26. In such cases, employing the ring shaped seam 79, 83 suppresses (relieves) localized concentration of stress on the base cloth of the inflated and deployed rear inflation section 26 that has a relatively high internal pressure.

Figure 13:
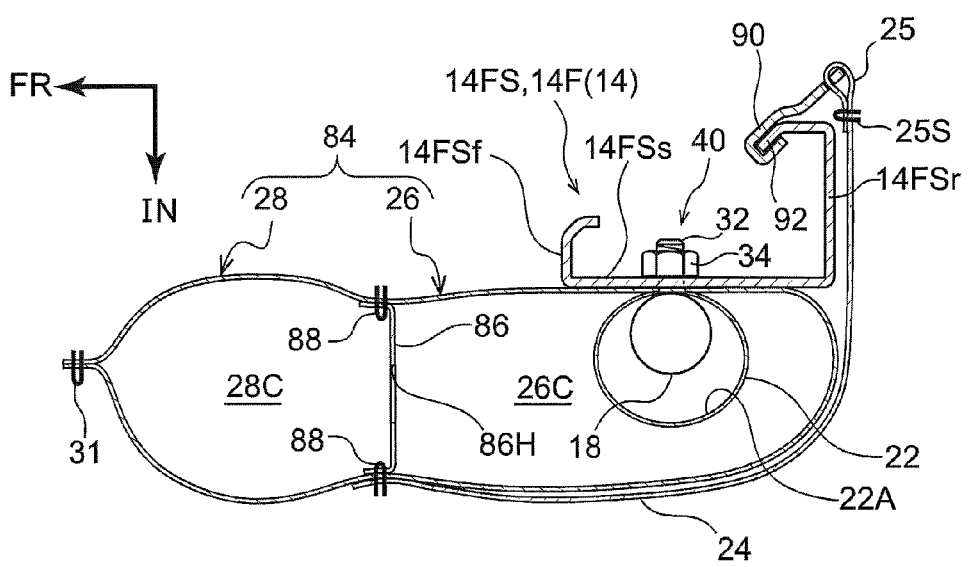
FIG. 13 is a cross-section corresponding to FIG. 1, illustrating a modified example of a side airbag, and a modified example of a connection structure of a rear end side of a tension cloth to a seatback frame, in a far side airbag device according to an exemplary embodiment of the present invention.

Modified Examples of the Connection Structure of the Side Airbag and Tension Cloth FIG. 13 illustrates a side airbag 84 according to a modified example. As illustrated in FIG. 13, the side airbag 84 is partitioned (divided) into the rear inflation section 26 and the front inflation section 28 by a tether 86, this being a partitioning cloth, extending in the seat width direction in plan view. The tether 86 is formed with a through hole 86H serving as a communication path. Both ends of the tether 86 in the seat width direction are stitched to the base cloth of the side airbag 84 at seams 88. A front end of the tension cloth 24 is connected to the side airbag 84 by stitching to the base cloth to the seat width direction outside of the side airbag 84 at the seam 88, together with an end portion of the tether 86.

FIG. 13 also illustrates a modified example of a connection structure of the rear end of the tension cloth 24 to the seatback frame 14F. Hook members 90 are anchored to the anchor tabs 25 of the tension cloth 24, and the hook members 90 are hooked over a flange 92 that juts out from a seat width direction inner end of the rear wall 14FSr of the seatback frame 14F toward the front. The rear end of the tension cloth 24 is thus connected to the seatback frame 14F.

The connection structure configured by the hook members 90 may also be applied to tension cloths other than the tension cloth 24 (any of the outside tension cloths or inside tension cloths of the respective configurations described above).

Figure 14:
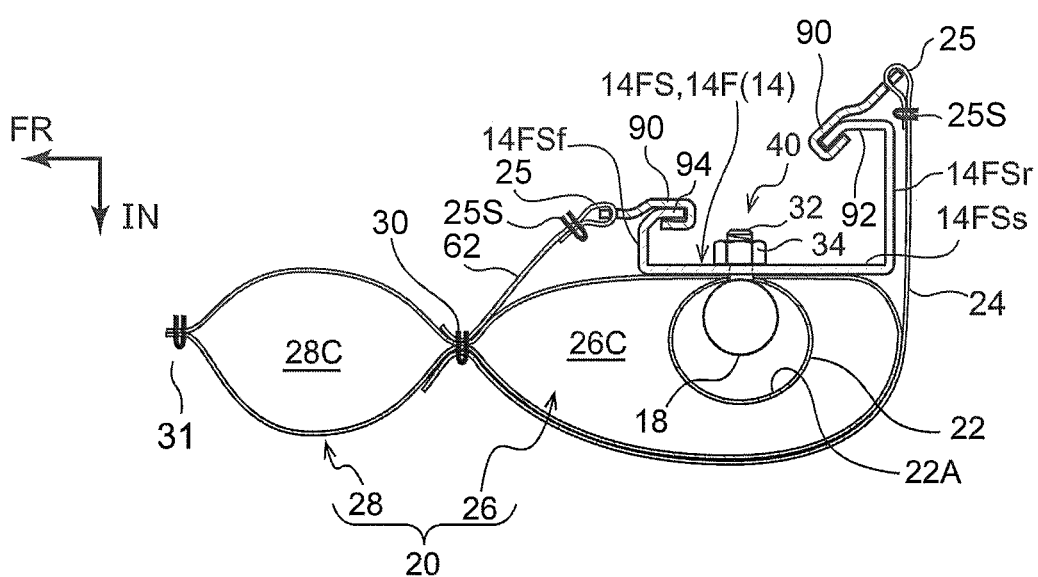
FIG. 14 is a cross-section corresponding to FIG. 1, illustrating a second modified example of a connection structure of a rear end side of a tension cloth to a seatback frame in a far side airbag device according to an exemplary embodiment of the present invention.

In a second modified example illustrated in FIG. 14, a connection structure of the rear end of the outside tension cloth 24 to the seatback frame 14F is similar to that in the modified example of FIG. 13. Hook members 90 are also anchored to the rear end of the inside tension cloth 62 through the anchor tabs 25, and the hook members 90 are hooked over a flange 94 that juts out toward the rear from a seat width direction inner end of the front wall 14FSf of the seatback frame 14F.

Figure 15:
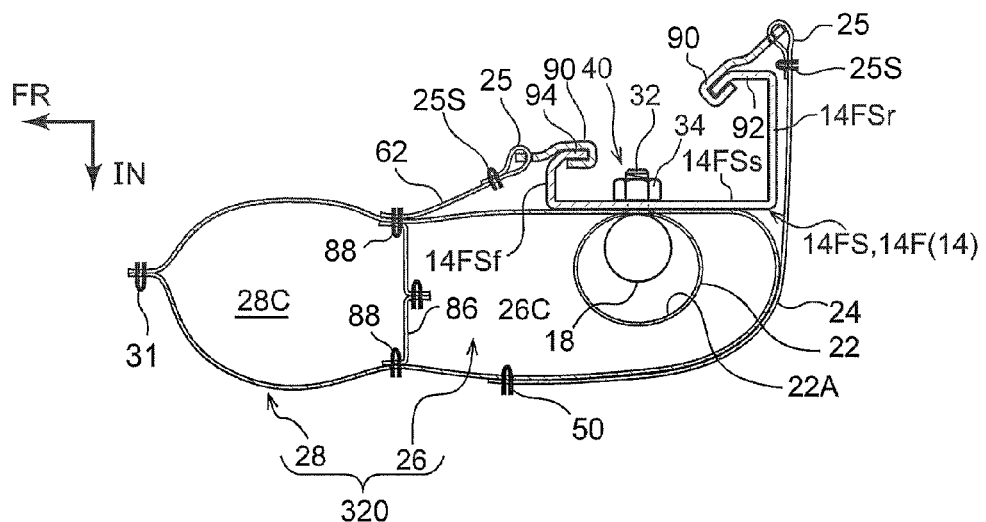
FIG. 15 is a cross-section corresponding to FIG. 1, illustrating a third modified example of a connection structure of a rear end side of a tension cloth to a seatback frame in a far side airbag device according to an exemplary embodiment of the present invention.

In a third modified example illustrated in FIG. 15, only a side airbag 320 differs from the second modified example. Namely, in contrast to the side airbag 20 according to the second modified example, in which the rear inflation section 26 and the front inflation section 28 are divided by the seam 30, in the third modified example, the rear inflation section 26 and the front inflation section 28 are divided by the tether 86. Note that the illustrated example of the side airbag 320 is an example in which the tether 86 is segmented along the seat width direction and has a dual sheet structure, with a through hole 86H formed at a position that is not illustrated. The tether 86 may have a similar configuration to that illustrated in FIG. 13 (the same applies hereafter in the present specification).

Figure 16:
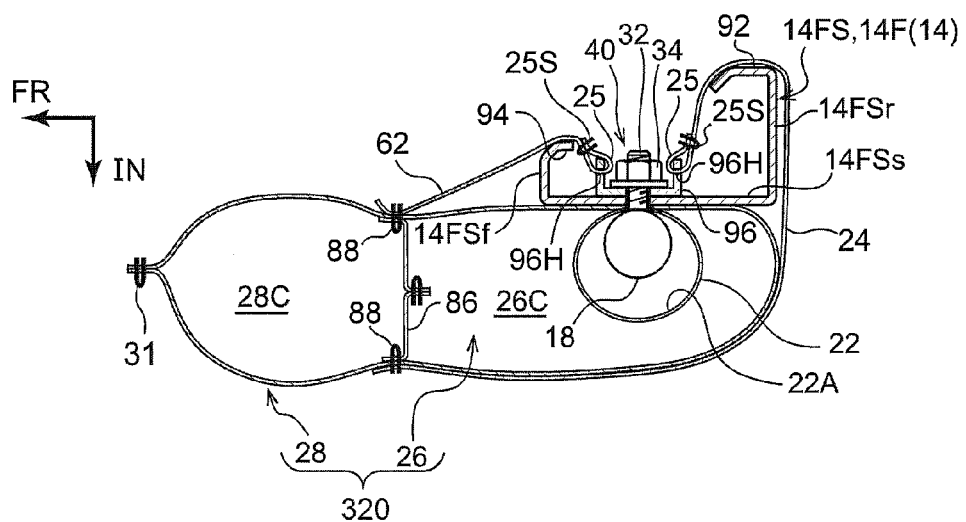
FIG. 16 is a cross-section corresponding to FIG. 1, illustrating a fourth modified example of a connection structure of a rear end side of a tension cloth to a seatback frame in a far side airbag device according to an exemplary embodiment of the present invention.

In a fourth modified example illustrated in FIG. 16, rear end sides of inside and outside tension cloths 24, 62 are connected to the seatback frame 14F by the fastening structure 40, together with the inflator 18 and the side airbag 20. Specifically, a plate 96 is fixed to the side wall 14FSs of the seatback frame 14F by the fastening structure 40, and anchor tabs 41 of the respective tension cloths 24, 62 are passed through and anchored to anchor holes 96H formed at front and rear ends of the plate 96.

Figure 17:
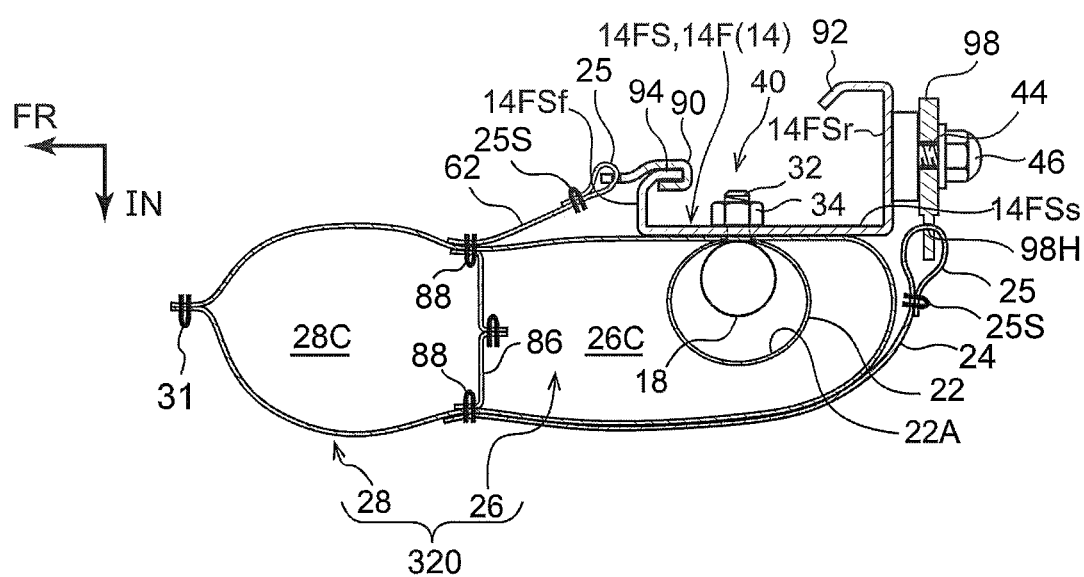
FIG. 17 is a cross-section corresponding to FIG. 1, illustrating a fifth modified example of a connection structure of a rear end side of a tension cloth to a seatback frame in a far side airbag device according to an exemplary embodiment of the present invention.

In a fifth modified example illustrated in FIG. 17, a rear end of the inside tension cloth 62 is connected to the seatback frame 14F through hook members 90, and a rear end of the outside tension cloth 24 is connected to the seatback frame 14F through a plate 98. The plate 98 is fastened to the rear wall 14FSr by screwing a nut 46 onto a welded stud bolt 44 in a state in which the welded stud bolt 44 passes through the plate 98. The anchor tabs 25 of the tension cloth 24 are anchored to anchor holes 98H of the plate 98.

Figure 18:
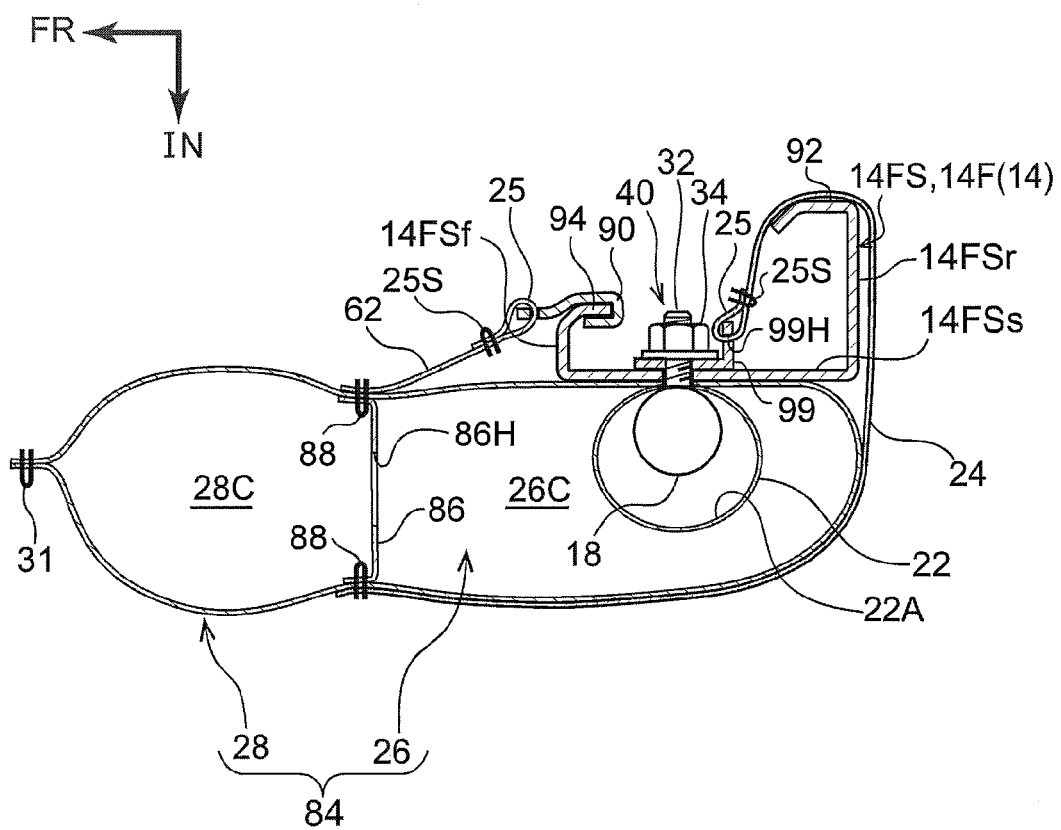
FIG. 18 is a cross-section corresponding to FIG. 1, illustrating a sixth modified example of a connection structure of a rear end side of a tension cloth to a seatback frame in a far side airbag device according to an exemplary embodiment of the present invention.

A sixth modified example illustrated in FIG. 18 differs from the fifth modified example in that a rear end side of the outside tension cloth 24 is connected to the seatback frame 14F by the fastening structure 40, together with the inflator 18 and the side airbag 20. Specifically, a plate 99 is fixed to the side wall 14Fss of the seatback frame 14F by the fastening structure 40, and anchor tabs 41 of the tension cloth 24 are passed through and anchored to anchor holes 9911 formed to a rear end of the plate 99.

Figure 19:
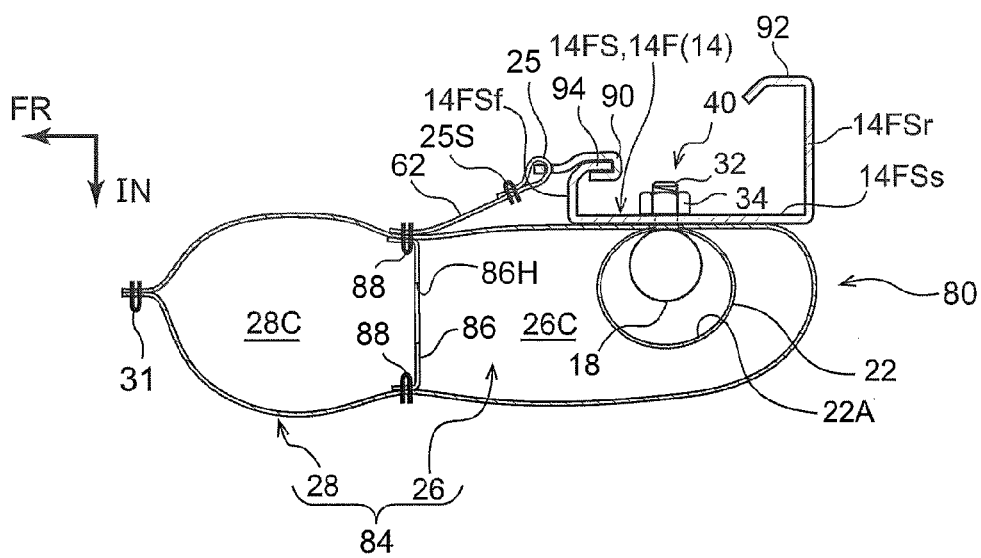
FIG. 19 is a cross-section corresponding to FIG. 1, illustrating a seventh modified example of a connection structure of a rear end side of a tension cloth to a seatback frame in a far side airbag device according to an exemplary embodiment of the present invention.

A seventh modified example illustrated in FIG. 19 includes an inside tension cloth 62, but is not provided with an outside tension cloth. A rear end side of the inside tension cloth 62 is connected to the seatback frame 14F by hook members 90.

Other Modified Examples

In the respective exemplary embodiments and the respective modified examples described above, explanation has been given regarding examples in which the present invention is applied to a driving seat or passenger seat; however the present invention is not limited thereto. For example, the present invention may be applied to seats in a second row onward when left and right seats are disposed at a separation to each other in the vehicle width direction (separated type layout). The far side airbag device 10, etc., may, for example, be provided at two seats adjacent to each other in the vehicle width direction (for example a driving seat and a passenger seat), or may be provided to only one of the seats.

In the respective exemplary embodiments and the respective modified examples described above, explanation has been given regarding examples in which the inflator 18 actuates in the event of a side-on vehicle collision; however the present invention is not limited thereto. For example, configuration may be made such that the inflator 18 actuates in the event of a small overlap collision in which an oncoming vehicle collides with the vehicle at an outer end portion in the vehicle width direction, or an oblique collision in which an oncoming vehicle collides with the vehicle diagonally from the front.

Moreover, in the respective exemplary embodiments and the respective modified examples described above, explanation has been given regarding examples in which the front inflation section 28 restrains (protects) the head of the seated occupant D; however the present invention is not limited thereto. It is sufficient that the front inflation section 28 is configured to restrain front parts of the chest and abdomen of the seated occupant D, and may, for example, be configured without a portion for restraining the head.

In the respective exemplary embodiments and the respective modified examples described above, explanation has been given regarding examples in which the flow regulator cloth 22 is provided inside side airbag 20; however the present invention is not limited thereto. For example, configuration may be made without the flow regulator cloth.

In the respective exemplary embodiments and the respective modified examples described above, explanation has been given regarding examples in which the rear inflation section 26 and the front inflation section 28 are divided by the seam 30 or the tether 86. In each of the respective exemplary embodiments and the respective modified examples, the structure dividing the rear inflation section 26 and the front inflation section 28 may be selected from the seam 30 and the tether 86 as appropriate.

Moreover, the tension cloths in the respective exemplary embodiments and the respective modified examples described above are not limited to a woven fabric, and may, for example, be configured from net materials that are less liable to stretch than the base cloths (skin) of the side airbag 20.

In the respective exemplary embodiments and the respective modified examples described above, explanation has been given in which the connection location of the rear end side of the tension cloth 24, 70 to 78 to the seatback frame is at the rear side of the fastening structure 40. This point is satisfied as long as configuration is made such that the rear inflation section 26 adopts a deployed (tension-applied) state in which the rear inflation section 26 is pressed against the seatback frame 14F by a reaction force from the tension cloth 24. In other words, this point is satisfied as long as configuration is made such that tension acting on the tension cloth 24 is supported by the seatback frame 14F at the rear side of the fastening structure 40 (the tension cloth 24 is wrapped around the seatback frame 14F at the rear side of the fastening structure 40). Accordingly, for example, as in the modified example illustrated in FIG. 16, configuration may be made in which the rear end side of the tension cloth 24 is connected to the seatback frame 14F by the fastening structure 40. Moreover, for example, the rear end side of the tension cloth 24 may run around to the seat width direction inside of the seatback frame 14F and be connected to the seatback frame 14F further to the front side than the fastening structure 40.

It goes without saying that various other modifications may be implemented within a range not departing from the scope of the present invention. For example, configurations (elements) of the respective exemplary embodiments and modified examples described above may be combined or exchanged with each other as appropriate.

What is claimed is:

1. A far side airbag device comprising:
a side airbag provided at a side section on a vehicle center side of a seatback in a vehicle width direction, the side airbag comprising a rear inflation section that inflates and deploys when supplied with gas and that restrains at least rear parts of the chest and abdomen of a seated occupant, and a front inflation section that inflates and deploys when supplied with gas through a communication path formed at a boundary with the rear inflation section and that restrains at least front parts of the chest and abdomen of the seated occupant,
  wherein the side airbag is divided into the rear inflation section configuring a rear lower portion of the side airbag, and the front inflation section configuring a remainder of the side airbag, the boundary between the rear inflation section and the front inflation section is formed by stitching together base cloths of the side airbag with seams, and the rear inflation section and the front inflation section are in communication with each other through the communication path formed as a discontinuous portion at the boundary where the seams are not present; and
  wherein a part of the boundary is between the rear lower portion of the side airbag and a rear upper portion of the side airbag;
a fixing structure that fixes the side airbag to a seatback frame at the rear inflation section; and
a tension cloth that receives tension and deploys accompanying inflation and deployment of the side airbag, wherein a vehicle front-rear direction front end side of the tension cloth is connected to the side airbag and a vehicle front-rear direction rear end side of the tension cloth is connected to the seatback frame, and in a deployed state, the tension cloth covers at least a portion of the rear inflation section as viewed from a side of the seatback, wherein a length of the tension cloth in the vehicle up-down direction at the rear end side of the tension cloth is shorter than a length of the tension cloth in the vehicle up-down direction at the front end side of the tension cloth, and wherein the front end side of the tension cloth is connected to the side airbag at the boundary between the rear inflation section and the front inflation section.

2. The far side airbag device of claim 1, wherein:
the rear inflation section includes a shoulder restraint portion that restrains the shoulder region of the seated occupant in an inflated and deployed state; and
the tension cloth deploys to cover at least a portion of the shoulder restraint portion as viewed from the side of the seatback.

3. The far side airbag device of claim 1 comprising, as the tension cloth:
an outside tension cloth with the rear end side thereof connected to a portion of the seatback frame positioned to the rear side of the fixing structure in the vehicle front-rear direction, and that deploys at the seat width direction outside of the side airbag.

4. The far side airbag device of claim 3, wherein:
in plan view, a peripheral length of the outside tension cloth from a connection location with the side airbag to a connection location with the seatback frame is the same as or less than a peripheral length of the side airbag from a fixing location with the seatback frame to the connection location with the outside tension cloth.

5. The far side airbag device of claim 1, comprising, as the tension cloth, an inner side tension cloth that deploys at the seat width direction inner side of the side airbag.

6. The far side airbag device of claim 1, wherein:
the front inflation section includes a portion that inflates and deploys to the upper side of the rear inflation section in a vehicle up-down direction; and
the tension cloth deploys to cover at least an upper portion of the rear inflation section.

7. The far side airbag device of claim 5, wherein:
at least one out of a rear end side of an outside tension cloth or the rear end side of the inner side tension cloth is connected to the fixing structure.

8. The far side airbag device of claim 3, comprising, as the tension cloth, an inner side tension cloth that deploys at the seat width direction inner side of the side airbag.

9. The far side airbag device of claim 1, wherein the front inflation section is supplied with gas through the communication path from the rear inflation section, and an internal pressure of the rear inflation section is higher than an internal pressure of the front inflation section in the inflated and deployed state.

* * * * *